US010599397B1

(12) United States Patent
Vakili

(10) Patent No.: US 10,599,397 B1
(45) Date of Patent: *Mar. 24, 2020

(54) APPARATUSES AND METHODS FOR IMPROVED PSEUDO-RANDOM NUMBER GENERATION

(71) Applicant: Wells Fargo Bank, N.A., San Francisco, CA (US)

(72) Inventor: Masoud Vakili, Los Altos, CA (US)

(73) Assignee: WELLS FARGO BANK, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/454,869

(22) Filed: Jun. 27, 2019

Related U.S. Application Data

(63) Continuation of application No. 15/900,485, filed on Feb. 20, 2018, now Pat. No. 10,372,418.

(51) Int. Cl.
*G06F 7/58* (2006.01)
(52) U.S. Cl.
CPC .................. *G06F 7/584* (2013.01)
(58) Field of Classification Search
CPC ....................................... G06F 7/584
USPC ................................ 708/250–256
See application file for complete search history.

(56) References Cited

U.S. PATENT DOCUMENTS

| 7,155,416 | B2* | 12/2006 | Shatford | G06F 21/32 705/67 |
| 7,793,109 | B2* | 9/2010 | Ortiz | H04L 63/0861 713/186 |
| 2011/0302420 | A1* | 12/2011 | Davida | G06F 21/32 713/180 |
| 2014/0089243 | A1* | 3/2014 | Oppenheimer | G06F 21/50 706/46 |

FOREIGN PATENT DOCUMENTS

| GB | 2492050 A | * 12/2012 | ............ G06F 21/32 |
| WO | WO-2008030184 A1 | * 3/2008 | ............ G06F 21/32 |

OTHER PUBLICATIONS

Lami, I. A. et al., LocBiometrics: Mobil Phone Based Multi-Factor Biometric Authentication With Time and location Assurance, 18th Telecommunications Forum TELFOR 2010 (Nov. 23-25, 2010), pp. 151-154.*

* cited by examiner

*Primary Examiner* — Tan V Mai
(74) *Attorney, Agent, or Firm* — Alston & Bird LLP

(57) ABSTRACT

A method, apparatus, and computer program product for improved pseudo-random number generation are provided. An example method includes receiving, by a computing device, a request for a pseudo-random number, selecting, by randomization circuitry of the computing device, a first attribute from a biometric attribute dataset, and obtaining a first value for the first attribute. The method further includes selecting, by the randomization circuitry, a second attribute, and obtaining a second value for the second attribute. The method includes convoluting, by convolution circuitry, the first value with the second value to generate the pseudo-random number.

20 Claims, 6 Drawing Sheets

200

APPARATUSES AND METHODS FOR IMPROVED PSEUDO-RANDOM NUMBER GENERATION

CROSS REFERENCE TO RELATED APPLICATIONS

The present application is a continuation application of U.S. patent application Ser. No. 15/900,485, filed Feb. 20, 2018, which is hereby incorporated by reference in its entirety.

TECHNOLOGICAL FIELD

Example embodiments of the present invention relate generally to pseudo-random number generation and, more particularly, to the use of convoluted biometrics to improve pseudo-random number generation.

BACKGROUND

Pseudo-random number generation is used in a variety of applications from electronic gambling games to cryptography. While often referred to as "random number generation," in truth it is difficult to generate truly random numbers, and historical tools for "random" number generation have usually employed procedures whose outputs can be reproduced if certain underlying inputs are known. Relatively recently, the use of pseudo-random numbers has grown in prevalence in fraud prevention and security protocols. For example, pseudo-random numbers may be used to authenticate a session or other interaction between two devices by serving as a unique session identifier. Traditional methods for generating a pseudo-random number for authenticating a session, however, have become increasingly susceptible to attack as the availability of computing power has increased. If a perpetrator has access to a user's device or information related to a user's session such as the user's access time, there are now often sufficient computing resources needed for a malicious attacker to perform a brute force attack exploiting the vulnerability of pseudo-random number generation techniques. In this way, a user's session may be compromised simply by virtue of the new technical problems emergent in response to the growing computing resources available today, because perpetrators have a greater ability to determine the method by which the session identifier is pseudo-randomly generated, replicate the method to generate the same session identifier, and break into the user's session.

BRIEF SUMMARY

To solve these issues, example implementations of embodiments of the present invention may utilize biometric features of a user, convoluted by an independent factor, to reduce or eliminate the exposure of a pseudo-random number generator to an attack that might allow a perpetrator to determine a pseudo-random number generated by more straightforward techniques. Embodiments of the present disclosure provide hardened session authentication techniques by convoluting at least one pseudo-randomly selected biometric attribute with an independent factor (e.g., session time) in order to generate a unique seed for generation of a pseudo-random number used to establish a secure session. For example, the method may select one of various possible biometric attributes (e.g., fingerprints, iris scans, retina scans, vein pattern, hair expression, bodily expression, or the like) of a user and then obtain the selected biometric attribute from the user. The method may then binarize the biometric attribute and convolute the binarized biometric attribute data with an independent factor such as session time or another selected biometric attribute. The convoluted data is then used to generate a pseudo-random number. The convolution of a pseudo-randomly-selected biometric attribute and an independent factor provides increased session security by requiring a perpetrator to (1) access each of a user's biometric attributes, (2) select the correct biometric attribute, (3) access the user's session time or other independent factor, and then (4) learn the appropriate transformation applied using the steps describe above.

Systems, apparatuses, methods, and computer program products are disclosed herein for improved pseudo-random number generation. In one embodiment, with reference to the claimed method, a method for improved pseudo-random number generation is provided. The method may include receiving, by a computing device, a request for a pseudo-random number, selecting, by randomization circuitry of the computing device, a first attribute from a biometric attribute dataset, and obtaining a first value for the first attribute. The method may further include selecting, by the randomization circuitry, a second attribute, and obtaining a second value for the second attribute. The method may include convoluting, by convolution circuitry of the computing device, the first value with the second value to generate the pseudo-random number.

In some embodiments, the method may further include receiving, by communications circuitry of the computing device, an instruction to generate a session identifier from a first user device associated with a first user. In such an embodiment, the method may include determining, by authentication circuitry of the computing device that the request for the session identifier requires the pseudo-random number, and generating, by the authentication circuitry, the session identifier based upon the pseudo-random number. The method may further include transmitting, the session identifier to the first user device.

In some further embodiments, the method may further include generating, by the computing device, a data seed based on the pseudo-random number, wherein the session identifier comprises the generated data seed. In some other embodiments, the session identifier may include the pseudo-random number. In some still other embodiments, the method may include transmitting, by the authentication circuitry, the session identifier to an external device.

In some cases, obtaining the first value comprises querying, by communications circuitry of the computing device, a biometric attribute dataset storing one or more previously acquired biometric attributes of a first user.

In some other cases, obtaining the first value includes requesting, by the computing device, user input corresponding to the first biometric attribute, and binarizing, by binarization circuitry of the computing device, the user input to generate the first value.

In some embodiments, obtaining the second value includes requesting, by the computing device, user input corresponding to a second biometric attribute, and binarizing, by the binarization circuitry, the user input corresponding to the second biometric attribute to generate the second value. In such an embodiment, obtaining the second value further comprises requesting, by the computing device, user input comprising a modified form of the first biometric attribute.

In some other cases, obtaining the second value includes querying, by the communications circuitry, an independent factor dataset storing one or more parameters of the computing device to identify a particular independent factor, wherein the second value comprises the identified particular independent factor. In such an embodiment, the identified particular independent factor may comprise a current time, and wherein obtaining the second value comprises generating a current time from an internal system clock of the computing device or identifying a time at which the request for the pseudo-random number was received by the computing device.

In some embodiments, selection of the first attribute comprises implementing, by the randomization circuitry, a pseudo-random selection protocol that identifies a first particular attribute from the biometric attribute data set.

In other embodiments, selection of the second attribute comprises implementing, by the randomization circuitry, a pseudo-random selection protocol that identifies a second particular attribute from the biometric attribute data set.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
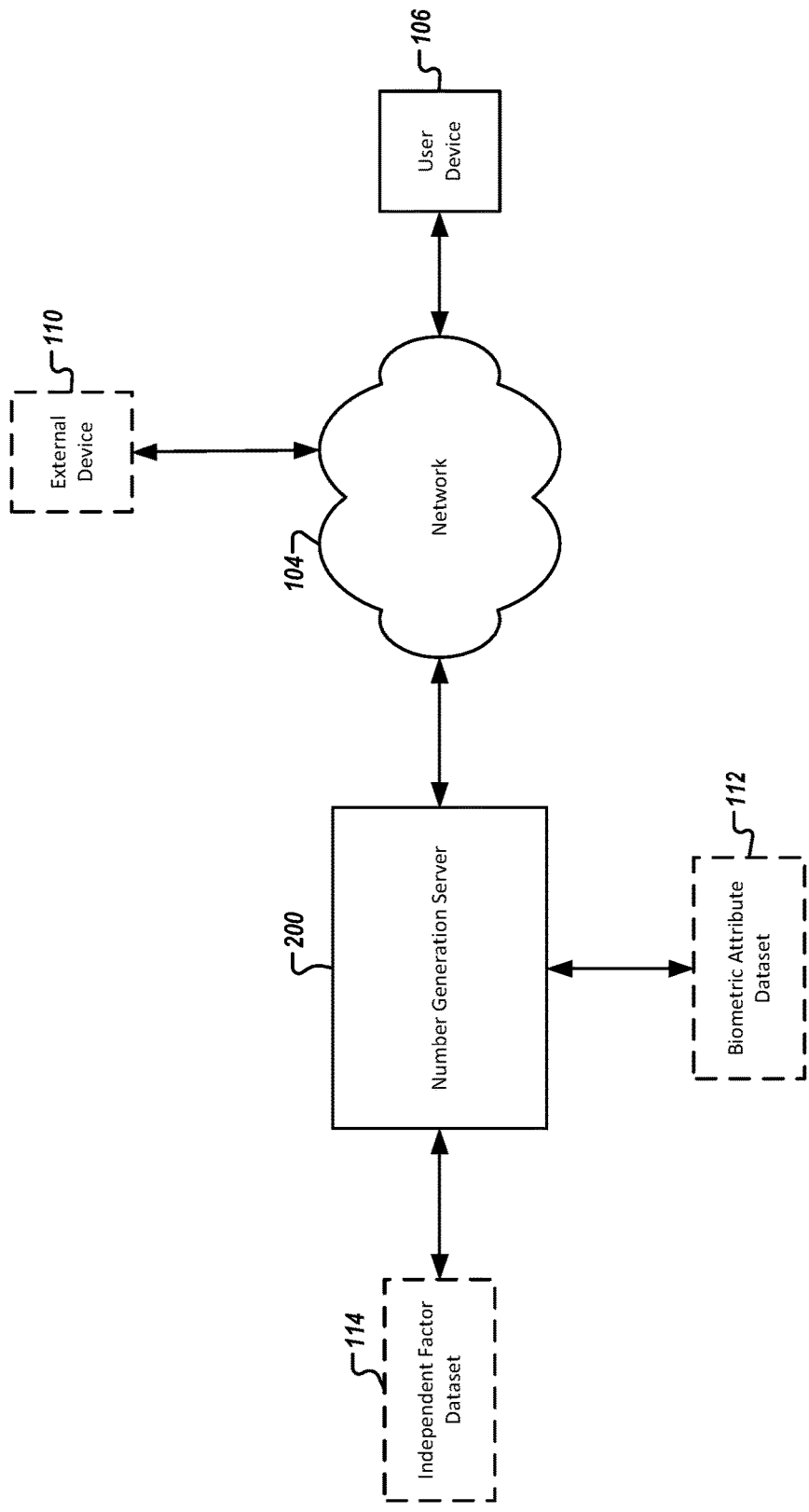
FIG. 1 illustrates a system diagram including devices that may be involved in some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a number generation server as an example "apparatus." However, elements of the apparatus described herein may be equally applicable to the claimed method and computer program product. Thus, use of any such terms should not be taken to limit the spirit and scope of embodiments of the present invention.

Overview

As noted above, methods, apparatuses, systems, and computer program products are described herein that provide solutions to the problems identified above, as well as to others. In one embodiment, a computing device (e.g., number generation server 200) may receive a request for a pseudo-random number. The computing device may, by randomization circuitry, select a first attribute (e.g., fingerprints, iris scans, retina scans, vein pattern, hair expression, bodily expression, or the like) from a biometric attribute dataset. The computing device may then obtain a first value for the first attribute. The randomization circuitry may also select a second attribute (e.g., another biometric feature or other independent factor) and may obtain a second value for the second attribute. The computing device may, by convolution circuitry, convolute the first value with the second value to generate the pseudo-random number. This pseudo-random number may thereafter be used in a variety of different ways. For instance, it may be used for generation of a unique session identifier for a communication session between computing devices. As another example, the pseudo-random number may be used as the seed for still further data transformations in support of a variety of operations in gaming devices, statistics, cryptography, or the like.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refers to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "user device," "first user device," "mobile device," "electronic device" and the like refer to computer hardware that is configured (either physically or by the execution of software) to access one or more services made available by the number generation server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with chip of other electronic device that is configured to communicate with the external device via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the number generation server 200 or other computing device via a network.

As used herein, the terms "user profile" and "first user profile" may refer to a collection of settings, configurations, identifiers, data, and information associated with a specific user. A user profile configured in accordance with the present invention may be accessible by one or more of software applications that are supported by the computing device (e.g., number generation server 200 in FIG. 1) or other external server or computing device (e.g., associated with a corporation, banking entity, or other 3$^{rd}$ party) and, thus, may include application-specific preferences, settings, configurations, data, and information.

As used herein, the term "external device" refers to any object, device, or system which may be in network communication with the user device. For example, an external device may be an external server or computing device (e.g., associated with a corporation, banking entity, or other 3$^{rd}$ party) that may request, receive, and/or provide data to or from one of the devices described above. By way of a more particular example, an external device may include a server of a bank, online vendor, or the like configured to be located in secure communication with the user device via an authenticated session (e.g., via the pseudo-random number techniques described herein).

As used herein, the term "biometric attribute dataset" refers to a data structure or repository for storing biometric attribute data. By way of example, the biometric attribute dataset may store data corresponding to one or more biometric attributes transmitted by input/output circuitry, communications circuitry, or the like of the user device. The biometric attribute data may be accessible by one or more software applications of the user device and/or number generation server.

As used herein, the term "independent factor dataset" refers to a data structure or repository for storing independent factor data. By way of example, the independent factor dataset may identify independent factors that comprise factors that have characteristics generated independently from a given biometric attribute (i.e., knowledge of the biometric attribute does not convey or imply certain knowledge about a given independent factor). One example independent factor may be a current time, and a value for this independent factor may be retrieved by a computing device from an internal system clock of the computing device (e.g., number generation server, external device, user device or the like) or a time at which a request for the pseudo-random number was received by the computing device (e.g., a number generation server, external device, user device or the like). Of course, this example is intended for descriptive purposes only and not to suggest that other independent factors may not be used. The independent factor dataset may comprise a repository identifying any number of independent factors.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., a number generation server 200) communicably connected via a network 104 to a user device 106 and, in some embodiments, an external device 110. The example system 100 may also include an independent factor dataset 114 and biometric attribute dataset 112 that may be hosted by the number generation server 200 or otherwise hosted by devices in communication with the number generation server 200.

The number generation server 200 may include circuitry, networked processors, or the like configured to perform some or all of the apparatus-based (e.g., number generation server-based) processes described herein, and may be any suitable network server and/or other type of processing device. In this regard, user device 106 may be embodied by any of a variety of devices. For example, the number generation server 200 may be configured to receive input data (e.g., biometric attribute data) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs, but will nevertheless include at least the components illustrated in FIG. 2 and described in connection therewith. In some embodiments, the number generation server 200 may be located remotely from the user device 106, external device 110, biometric attribute dataset 112, and/or independent factor dataset 114, although in other embodiments, the number generation server 200 may comprise the user device 106, external device 110, biometric attribute dataset 112, and/or independent factor dataset 114. The number generation server 200 may, in some embodiments, comprise several servers or computing devices performing interconnected and/or distributed functions. Despite the many arrangements contemplated herein, the number generation server 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The user device 106 may be associated with a first user and first user profile. Although a single user device associated with a corresponding user profile is shown, the example system 100 may include any number of user devices that may be associated with various users and/or user profiles. The user device 106 may be a cellular telephones (e.g., a smartphone and/or other type of mobile telephone), laptop, tablet, electronic reader, e-book device, media device, wearable, smart glasses, smartwatch, or any combination of the above.

The external device 110, as defined above, may be associated with any entity that is not associated with the user device 106. By way of a more particular example, the external device 110 may include a server of a bank, online vendor, or other $3^{rd}$-party configured to be in secure communication with the user device 106 via the network 104 (e.g., an authenticated session). Although shown as a single external device 110, the system 100 may include any number of external devices.

In some embodiments, the user device 106 may be configured to request a pseudo-random number (e.g., from the number generation server 200). The user device 106 may also allow a user to provide input (e.g., by way of a biometric scan) which may be conveyed to the number generation server 200 via the network 104 as input data. Input data may be generated via one or more input devices including, without limitation, a touchscreen, microphone, camera, optical scanner, fingerprint reader, and/or motion sensor device (e.g., an accelerometer, gyroscope, etc.).

The biometric attribute dataset 112 may be stored by any suitable storage device configured to store some or all of the information described herein (e.g., memory 204 of the number generation server 200 or a separate memory system separate from the number generation server 200, such as one or more database systems, backend data servers, network databases, cloud storage devices, or the like provided by an external device 110 (e.g., a banking entity or $3^{rd}$ party provider) or the user device 106). The biometric attribute dataset 112 may comprises data received from the number generation server 200 (e.g., via a memory 204 and/or processor(s) 202) or the user device 106, and the corresponding storage device may thus store this data. The independent factor dataset 114 may be stored by any suitable storage device in similar fashion as the biometric attribute dataset 112. It will be noted, however, that the independent factor dataset 114 may be stored by a distinct storage device from the storage device storing the biometric attribute dataset 112, or may be stored by the same storage device. To avoid unnecessarily overcomplicating the disclosure, the biometric attribute dataset 112 and independent factor dataset 114 are shown and described using corresponding blocks, despite the fact that they may each be hosted by any number of specific physical devices, together or separately.

Figure 2:
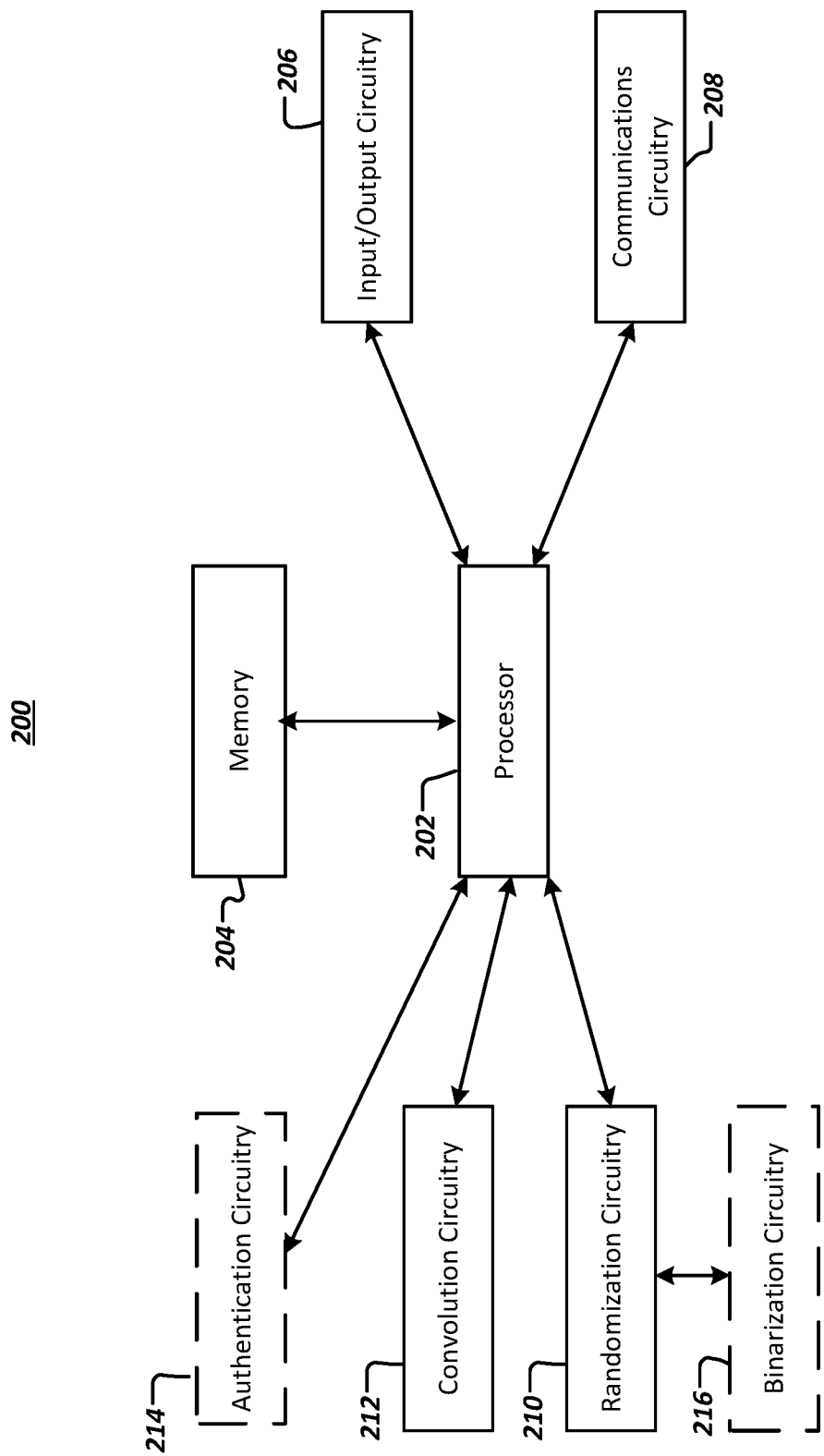
FIG. 2 illustrates a schematic block diagram of example circuitry that may perform various operations, in accordance with some example embodiments described herein.

As illustrated in FIG. 2, the number generation server 200 may include a processor 202, a memory 204, input/output circuitry 206, and communications circuitry 208. Moreover, number generation server 200 may include randomization circuitry 210, convolution circuitry 212, and, in some embodiments, authentication circuitry 214 and/or binarization circuitry 216. The number generation server 200 may be configured to execute the operations described below in connection with FIGS. 3-6. Although components 202-216 are described in some cases using functional language, it should be understood that the particular implementations necessarily include the use of particular hardware. It should also be understood that certain of these components 202-216 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the number generation server 200 may be housed within one or more of the first user device 106 or the external device 110. As indicated previously, it will be understood in this regard that some of the components described in connection with the number generation server 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the number generation server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the number generation server. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the number generation server to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the number generation server, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The number generation server 200 further includes input/output circuitry 206 that may, in turn, be in communication with processor 202 to provide output to a user and to receive input from a user, user device, or another source (e.g., so as receive biometric attribute data or independent factor data). In this regard, the input/output circuitry 206 may comprise a display that may be manipulated by a mobile application. In some embodiments, the input/output circuitry 206 may also include additional functionality keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like), so as receive biometric attribute data or independent factor data.

The communications circuitry 208 may be any means such as a device or circuitry embodied in either hardware or a combination of hardware and software that is configured to receive and/or transmit data from/to a network and/or any other device, circuitry, or module in communication with the number generation server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network.

Additionally or alternatively, the communication interface may include the circuitry for interacting with the antenna(s) to cause transmission of signals via the antenna(s) or to handle receipt of signals received via the antenna(s). These signals may be transmitted by the number generation server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Randomization circuitry 210 includes hardware components designed to select a first attribute from a biometric attribute dataset and to select a second attribute (e.g., from the biometric attribute dataset or from the independent factor dataset as will be described hereafter). The randomization circuitry 210 may further include hardware components designed to perform this pseudo-random selection of a first attribute and/or a second attribute. These hardware components may, for instance, utilize elements of processor 202 or memory 204 to pseudo-randomly select a biometric attribute of a user (e.g., fingerprints) from a dataset corresponding to a plurality of potential biometric attributes of the user (e.g., fingerprints, iris scans, retina scans, vein pattern, hair expression, bodily expression, or the like). Randomization circuitry 210 may utilize processing circuitry, such as the processor 202, to perform its corresponding operations, and may utilize memory 204 to store collected information. In some embodiments, the randomization circuitry may further include or be in communication with binarization circuitry 216. For example, in an instance in which the first value for the first attribute (e.g., biometric attribute) corresponds to a user inputted biometric attribute (e.g., a scanned fingerprint), the binarization circuitry 216 may be configured to convert a recorded image (e.g., of the user's finger) into a corresponding binary, numerical representation (e.g., in 1's and 0's) of the recorded image. It will be understood that binarization circuitry 216 is optional insofar as some embodiments may not require binarization of a biometric attribute value prior to convolution. In one example, this may be the case by virtue of the nature of the biometric attribute (e.g., as one basic example, if the biometric attribute comprises an indication of an individual's gender, it may be received in binary form and may need no further transformation to facilitate convolution). As another example where a biometric attribute value is retrieved from a memory or from another device, the biometric attribute value may have already been binarized elsewhere, in which case the apparatus 200 need not include additional binarization circuitry 216 to perform this function.

Convolution circuitry 212 includes hardware components designed to convolute a first value (corresponding to a biometric attribute) with a second value (corresponding to a second biometric attribute or independent factor) to generate a pseudo-random number. Convolution circuitry 212 may utilize processing circuitry, such as the processor 202, to perform its corresponding operations, and may utilize memory 204 to store collected information.

Authentication circuitry 214 includes hardware components designed to establish an authenticated session between the number generation server 200, the user device 106, and/or the external device 110. For example, the authentication circuitry 214 may, in some embodiments, identify a need for a pseudo-random number in response to receiving a request for some other purpose (e.g., a request for authentication by a user device 106) and may generate a session identifier based upon a generated pseudo-random number. Authentication circuitry 214 may utilize processing circuitry, such as the processor 202, to perform its corresponding operations, and may utilize memory 204 to store collected information. It will be understood that authentication circuitry 214 is optional insofar as some embodiments may not utilize a pseudo-random number in the context of session authentication and may utilize a generated pseudo-random number for other purposes, and such embodiments may thus have no need for authentication circuitry 214.

It should also be appreciated that, in some embodiments, the randomization circuitry 210, convolution circuitry 212, authentication circuitry 214, or binarization circuitry 216 may include a separate processor, specially configured field programmable gate array (FPGA), or application specific interface circuit (ASIC) to perform its corresponding functions.

In addition, computer program instructions and/or other type of code may be loaded onto a computer, processor or other programmable number generation server's circuitry to produce a machine, such that the computer, processor other programmable circuitry that execute the code on the machine create the means for implementing the various functions, including those described in connection with the components of number generation server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Improved Pseudo-Random Number Generation

Figure 3:
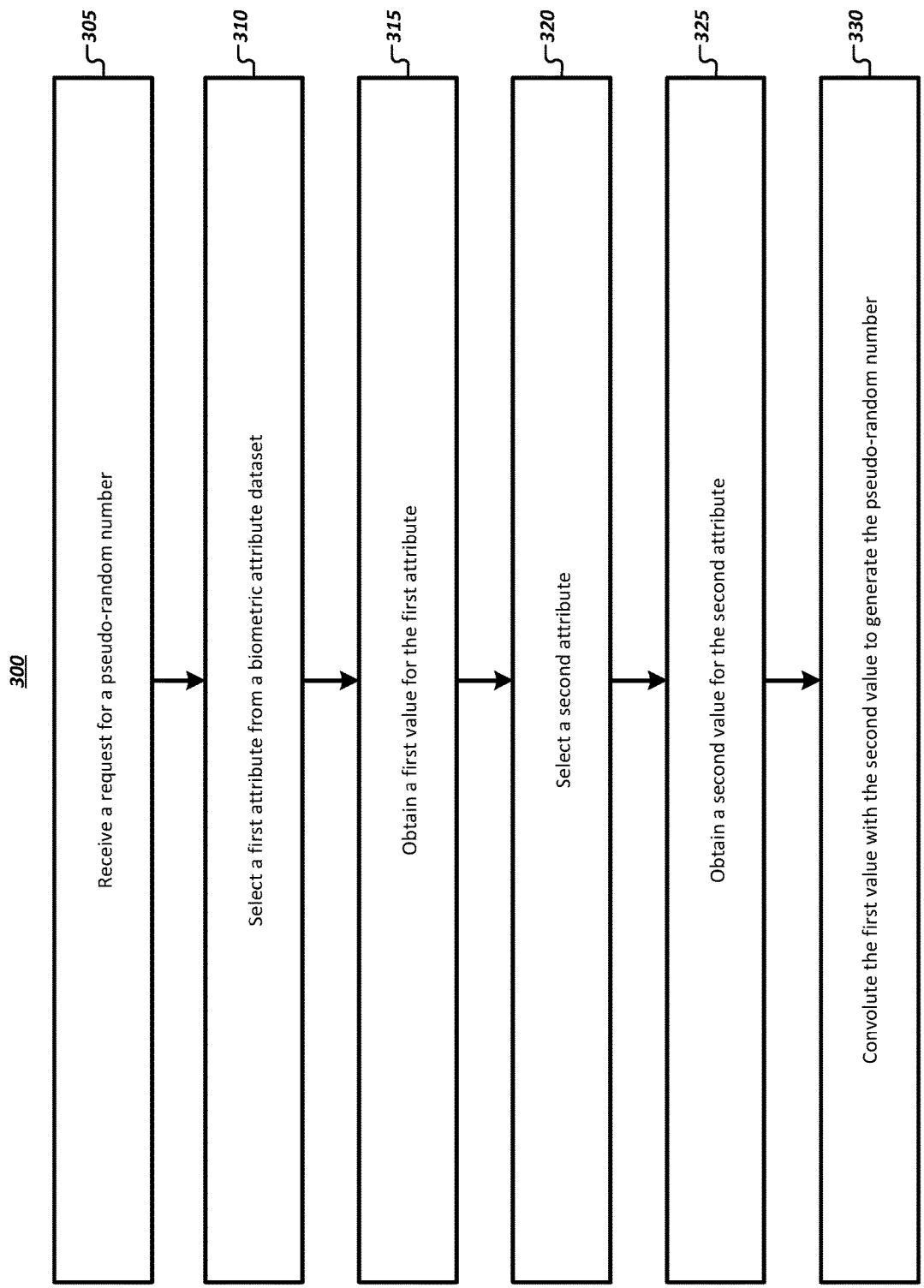
FIG. 3 illustrates an example flowchart for improved pseudo-random number generation, in accordance with some example embodiments described herein.

FIG. 3 illustrates a flowchart containing a series of operations for improved pseudo-random number generation. The operations illustrated in FIG. 3 may, for example, be performed by, with the assistance of, and/or under the control of an apparatus (e.g., number generation server 200), as described above. In this regard, performance of the operations may invoke one or more of processor 202, memory 204, input/output circuitry 206, communications circuitry 208, randomization circuitry 210, convolution circuitry 212, authentication circuitry 214, and/or binarization circuitry 216.

As shown in operation 305, the apparatus (e.g., number generation server 200) includes means, such as input/output circuitry 206, communications circuitry 208, or the like, for receiving a request for a pseudo-random number. In some example embodiments, as described above and more fully with reference to FIG. 4 below, the communications circuitry 208 may receive a request for a pseudo-random number or an instruction to generate a pseudo-random number from a user device 106 and/or external device 110. By way of example, the user device 106 may request an authorized session with the external device 110, and may request a pseudo-random number from the number generation server 200 to authorize the session (e.g., serve as a session identifier). Similarly, in some embodiments, the user device 106 may receive a request for a session from an external device 110, and may request a pseudo-random number from the number generation server 200 for use in authorizing the session. In some other embodiments, the input/output circuitry 206 of the number generation server 200 may receive a request (e.g., via a direct user input or automatically) for a pseudo-random number without input from the user device 106 or external device 110, such as in an instance in which the number generation server 200 requires a pseudo-random number to complete an internal process. Alternatively, however, the input/output circuitry 206 may receive the request for a pseudo-random number from direct user interaction with the number generation server 200.

Thereafter, as shown in operation 310, the apparatus (e.g., number generation server 200) includes means, such as randomization circuitry 210 or the like, for selecting a first attribute from a biometric attribute dataset. In some example embodiments, the randomization circuitry 210 may be configured to identify a plurality of attributes from the biometric attribute dataset 112 and pseudo-randomly select a first attribute to be obtained. By way of example, the randomization circuitry 210 may identify various possible biometric attributes including but not limited to a user's fingerprints, iris scans, retina scans, vein pattern, hair expression, bodily expression, or the like from a biometric attribute dataset. The manner by which the randomization circuitry 210 may pseudo-randomly select a particular attribute as the first attribute to be obtained is described below with reference to FIG. 5.

This selection at operation 310 may be pseudo-random in that the number generation server 200 may utilize its own pseudo-random selection techniques to ensure that the selection of the first attribute may not be determined or imitated by a perpetrator. By way of example, in some embodiments, once a first attribute is selected, a selection frequency for each biometric attribute may be monitored such that the likelihood that an unselected attribute is selected on subsequent selections at operation 310 is increased until the unselected attributed is selected as the first attribute. Said differently, in an instance in which a user's fingerprints are initially selected as the first attribute at operation 310, the remaining biometric attributes such as iris scan, hair expression, etc. may be weighted such that selection of these biometric attributes on subsequent selections of the first attribute is more likely as compared to the user's fingerprints. Once these remaining biometric features are selected as the first attribute, their corresponding weighting may decrease relative to other unselected features. To duplicate this pseudo-random process, an intruder would need to have insight into multiple different iterations of the pseudo-random number generation process, and even then would need to deduce the weighting scheme. While a frequency calculation procedure is outlined above, the present disclosure contemplates that any known pseudo-random number generation algorithm (e.g., a middle-square method, mersenne twister, inversive congruential generator, lagged Fibonacci generator, linear feedback shift register or the like) may additionally or alternatively be used to pseudo-randomly select the first attribute without departing from the scope of the disclosure.

Thereafter, as shown in operation 315, the apparatus (e.g., number generation server 200) includes means, such as processor 202, memory 204, input/output circuitry 206, communications circuitry 208, or the like, for obtaining a first value for the first attribute. In some example embodiments, as described in greater detail below in connection with FIG. 5, obtaining the first value includes querying, by the communications circuitry, a remotely stored biometric attribute dataset storing one or more previously acquired biometric attributes of a first user. In other embodiments where the biometric attribute dataset is not stored remotely, this operation may request this first value from a memory (e.g., memory 204) locally storing the biometric attribute dataset. In other embodiments, obtaining the first value includes requesting, by input/output circuitry of a first user device, a user input corresponding to the first biometric attribute. For example, the number generation server 200 may prompt the user (e.g., via a touchscreen display defined by the user device 106) to input the user's fingerprint (e.g., in an instance in which the user's fingerprint is the selected first attribute). Because in some embodiments the number generation server 200 comprises the first user device 106, this operation may utilize the input/output circuitry 206 of the number generation server 200 itself in some cases. All of these operations may, of course, be facilitated by processor 202. The number generation server 200 may further include binarization circuitry to binarize the user input to generate the first value, as described more fully with reference to FIG. 5 below.

Thereafter, as shown in operation 320, the apparatus (e.g., number generation server 200) includes means, such as processor 202, memory 204, input/output circuitry 206, randomization circuitry 210, or the like, for selecting a second attribute. In some example embodiments, the randomization circuitry 210 may be configured to pseudo-randomly identify a plurality of attributes from the biometric attribute dataset 112 or from the independent factor dataset 114 to select a second attribute to be obtained. By way of example, the randomization circuitry 210 may identify various possible biometric attributes, similar to those described in reference to selecting the first attribute at operation 310, as well as various independent factors (e.g., session time, server temperature, processor clock speed, etc.).

This selection at operation 320 may similarly be pseudo-random in that the number generation server 200 may utilize pseudo-random selection techniques to ensure that the selection of the second attribute may not be determined or imitated by a perpetrator. The procedure used to pseudo-randomly select this second attribute may parallel the procedure used in selection of the first attribute at operation 310. For instance, in some embodiments, once a second attribute is selected, a selection frequency for each biometric attribute and independent factor may be monitored such that the likelihood that an unselected attribute or unselected independent factor is selected on subsequent selections at operation 320 is increased until the unselected attribute or independent factor is selected as the second attribute. Said differently, in an instance in which a current time from an internal system clock of the number generation server 200 is selected as the second attribute to at operation 320, the remaining biometric attributes (e.g., iris scan, hair expression, etc.), and the remaining independent factors (e.g., server temperature, ambient temperature, processor clock speed, etc.) may be weighted such that selection of these biometric attributes or independent factors on subsequent selections of the second attribute are more likely as compared to current time from an internal system clock. Once these remaining biometric features and independent factors are selected as the second attribute, their corresponding weighting may decrease relative to other unselected attributes and factors. In this way, the randomization circuitry may pseudo-randomly select the second attribute. While described in reference to a frequency calculation, the present disclosure contemplates that any known pseudo-random number generation algorithm (e.g., a middle-square method, mersenne twister, inversive congruential generator, lagged Fibonacci generator, linear feedback shift register or the like) may be used to pseudo-randomly select the second attribute without departing from the scope of the disclosure. In addition, it will be understood that selection of the second attribute may be informed by the first selected attribute, such that the same biometric attribute is not selected in both cases.

Thereafter, as shown in operation 325, the apparatus (e.g., number generation server 200) includes means, such as processor 202, memory 204, input/output circuitry 206, communications circuitry 208, or the like, for obtaining a second value for the second attribute. In some example embodiments, as described in greater detail below in connection with FIG. 6, obtaining the second value includes querying, by the communications circuitry, a biometric attribute dataset storing one or more previously acquired biometric attributes of a first user and/or querying, by the communications circuitry, an independent factor dataset storing one or more parameters of the computing device to obtain the second value. In other embodiments, obtaining the first value includes requesting, by input/output circuitry of a first user device, a user input corresponding to the second biometric attribute. For example, the number generation server 200 may prompt the user (e.g., via a touchscreen display defined by the user device 106) to input the user's hair expression (e.g., a different biometric attribute than the selected first attribute). The number generation server 200 may further include binarization circuitry to binarize the user input to generate the second value as described more fully with reference to FIG. 6 below. In addition, in an instance in which an independent factor selected in operation 320 comprises a current time, the randomization circuitry 210 may obtain a value for the current time from an internal system clock of the number generation server 200, as described with reference to FIG. 6.

In some example embodiments, as described in greater detail below in connection with FIG. 6, obtaining the second value includes querying, by the communications circuitry, a biometric attribute dataset storing one or more previously acquired biometric attributes of a first user and/or querying, by the communications circuitry, an independent factor dataset storing one or more parameters of the computing device to obtain the second value. In other embodiments, obtaining the first value includes requesting, by input/output circuitry of a first user device, a user input corresponding to the second biometric attribute. For example, the number generation server 200 may prompt the user (e.g., via a touchscreen display defined by the user device 106) to input the user's retina scan (e.g., a different biometric attribute than the selected first attribute). The number generation server 200 may further include binarization circuitry to binarize the user input to generate the second value as described more fully with reference to FIG. 6 below.

Thereafter, as shown in operation 330, the apparatus (e.g., number generation server 200) includes means, such as convolution circuitry 212 or the like, for convoluting the first value with the second value to generate the pseudo-random number. As described above with reference to operations 315 and 325 above, and described further in FIGS. 5-6 below, the first value for the first attribute and the second value for the second attribute may comprise two pseudo-randomly selected numerical values. To convolute the first value with the second value to generate the pseudo-random number, the convolution circuitry 212 and/or processor 202 may perform any mathematical transformation based on the numerical values. For example, the convolution may, in some embodiments, comprise a multiplication of the first value and the second value to generate the pseudo random number. Similarly, the convolution may, in some embodiments, comprise an exponential function such that the first value is raised to the power of the second value. The present disclosure contemplates that any number of mathematical operations and combinations of mathematical operations (e.g., multiplication followed by an exponential function) may be used to convolute the first value and the second value to generate pseudo-random numbers of near-infinite scope and degree.

With continued reference to operation 330, in some embodiments, the convolution circuitry 212 and/or processor 202 may perform a mathematical convolution to generate the pseudo random number. As would be evident to one of ordinary skill in the art in light of the present disclosure, mathematical convolution refers to a mathematical operation performed on two functions (e.g., the first value and the second value) to produce a third function (e.g., the pseudo-random number) that is a modified version of one of the original functions, giving the integral of the pointwise multiplication of the two functions as a function of the amount that one of the original functions is translated. Thus, because of the many different mathematical transformations that might be performed by the convolution circuitry, the convolution described in operation 330 may in theory be used to generate pseudo-random numbers of near-infinite scope and degree such that the possibility of determining the pseudo-random numbers by a perpetrator is greatly reduced or substantially impossible.

Figure 4:
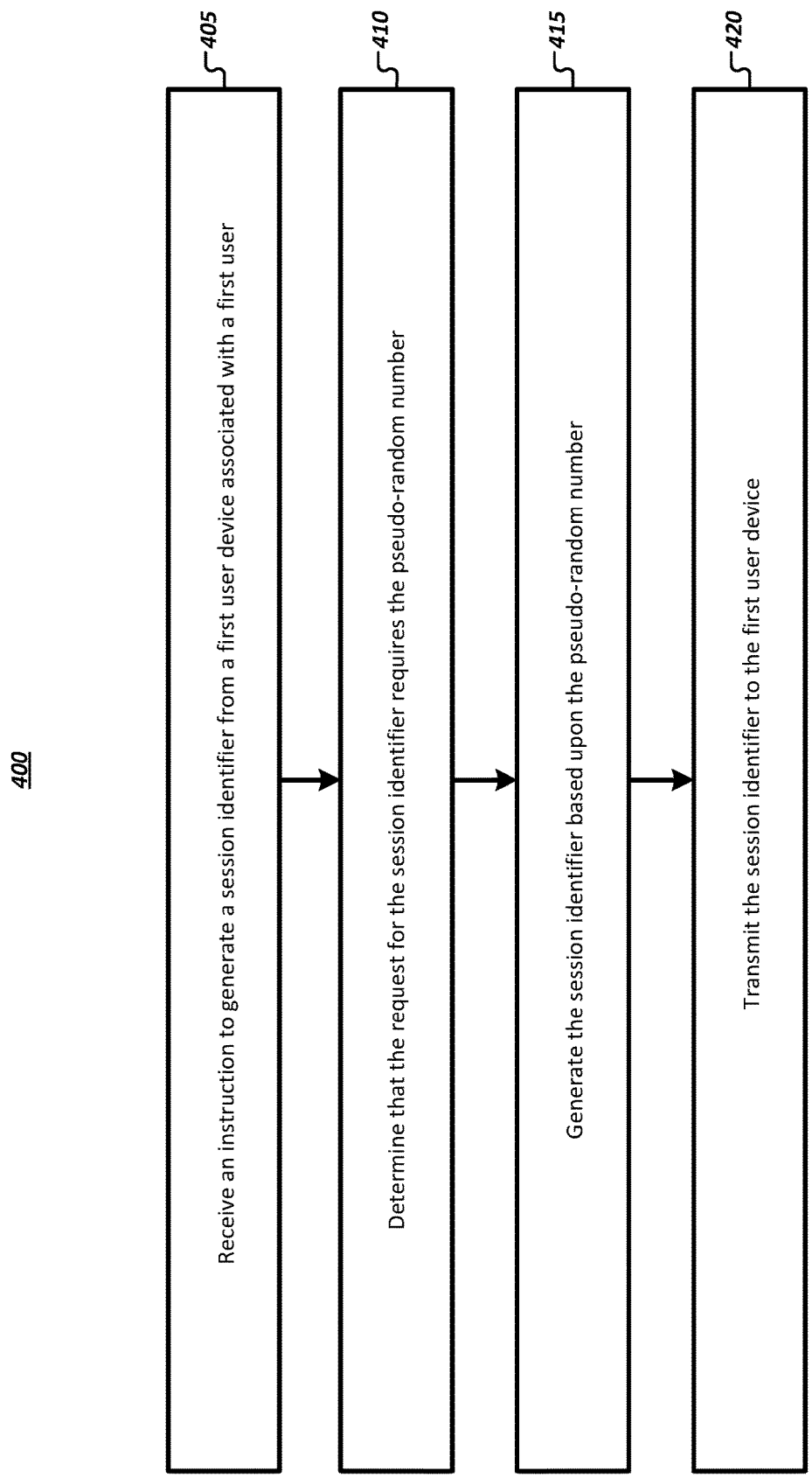
FIG. 4 illustrates an example flowchart for session authentication based on a generated pseudo-random number, in accordance with some example embodiments described herein.

Turning next to FIG. 4, a flowchart is shown that describes example embodiments for authentication based on the pseudo-random number of FIG. 3. The operations illustrated in FIG. 4 may, for example, be performed by, with the assistance of, and/or under the control of an apparatus (e.g., number generation server 200), as described above. In this regard, performance of the operations may invoke one or more of processor 202, memory 204, input/output circuitry 206, communications circuitry 208, randomization circuitry 210, convolution circuitry 212, authentication circuitry 214, and/or binarization circuitry 216.

In operation 405, the apparatus 100 may further include means, such as the input/output circuitry 206, communications circuitry 208, authentication circuitry 214, or the like for receiving an instruction to generate a session identifier from a first user device associated with a first user. As described in general above, in some embodiments, the user device 106 may transmit an instruction to the number generation server 200 to generate a pseudo-random number. By way of example, a first user device may be communicably connected to an external device 110 (e.g., an online vendor or banking entity) and may, due to the circumstances surrounding the connection (e.g., purchasing an item, performing a wire transfer, or the like), may request an authenticated session requiring a pseudo-random number. This request may be transmitted by the user device 106 as a results of a user input, but, in many cases, the user device 106 may automatically transmit a request for a pseudo-random number (e.g., an initial connection to the online vendor's website, logging into an online bank account, etc.).

Thereafter, as shown in operation 410, the apparatus (e.g., number generation server 200) includes means, such as processor 202, memory 204, communications circuitry 208, authentication circuitry 214, or the like, for determining that the request for the session identifier requires the pseudo-random number. This determination may be performed by the number generation server 200, and associated circuitry components, based upon the instructions from the first user device at operation 405. For example, the request from the first user device 106 may indicate that a pseudo-random number is necessary to serve as a session identifier to authenticate a session.

With reference to operation 415, the apparatus (e.g., number generation server 200) includes means, such as processor 202, memory 204, communications circuitry 208, authentication circuitry 214, or the like, for generating a session identifier based upon the pseudo-random number (e.g., generated by the operations of FIG. 3). In some embodiments, the the session identifier comprises the generated pseudo-random number. In such an embodiment, the resultant pseudo-random number (e.g., as generated by the operations of FIG. 3) may by transmitted by the number generation server 200 to one or more of the user device 106 or the external device 110. In other embodiments, the pseudo-random number generated by the operations of FIG. 3 may be used as a data seed based for use in further pseudo-random number operations. For example, the generated pseudo-random number may be used to seed a linear congruential generator (e.g., or other equivalent pseudo-random number generation algorithms) to further complicate the process required for a perpetrator to determine the session identifier. Although described in reference to a liner congruential generator, the present disclosure contemplates that any other pseudo-random number generation algorithm (e.g., a middle-square method, mersenne twister, inversive congruential generator, lagged Fibonacci generator, linear feedback shift register or the like) may be used without departing from the scope of the disclosure.

Thereafter, as shown in operation 420, the apparatus (e.g., number generation server 200) includes means, such as communications circuitry 208 or the like, for transmitting the session identifier to the first user device 106. As described above with reference to authenticating a session, the communications circuitry 208 may transmit the session identifier (based upon the pseudo-random number) to the first user device 106 to authenticate a session.

Figure 5:
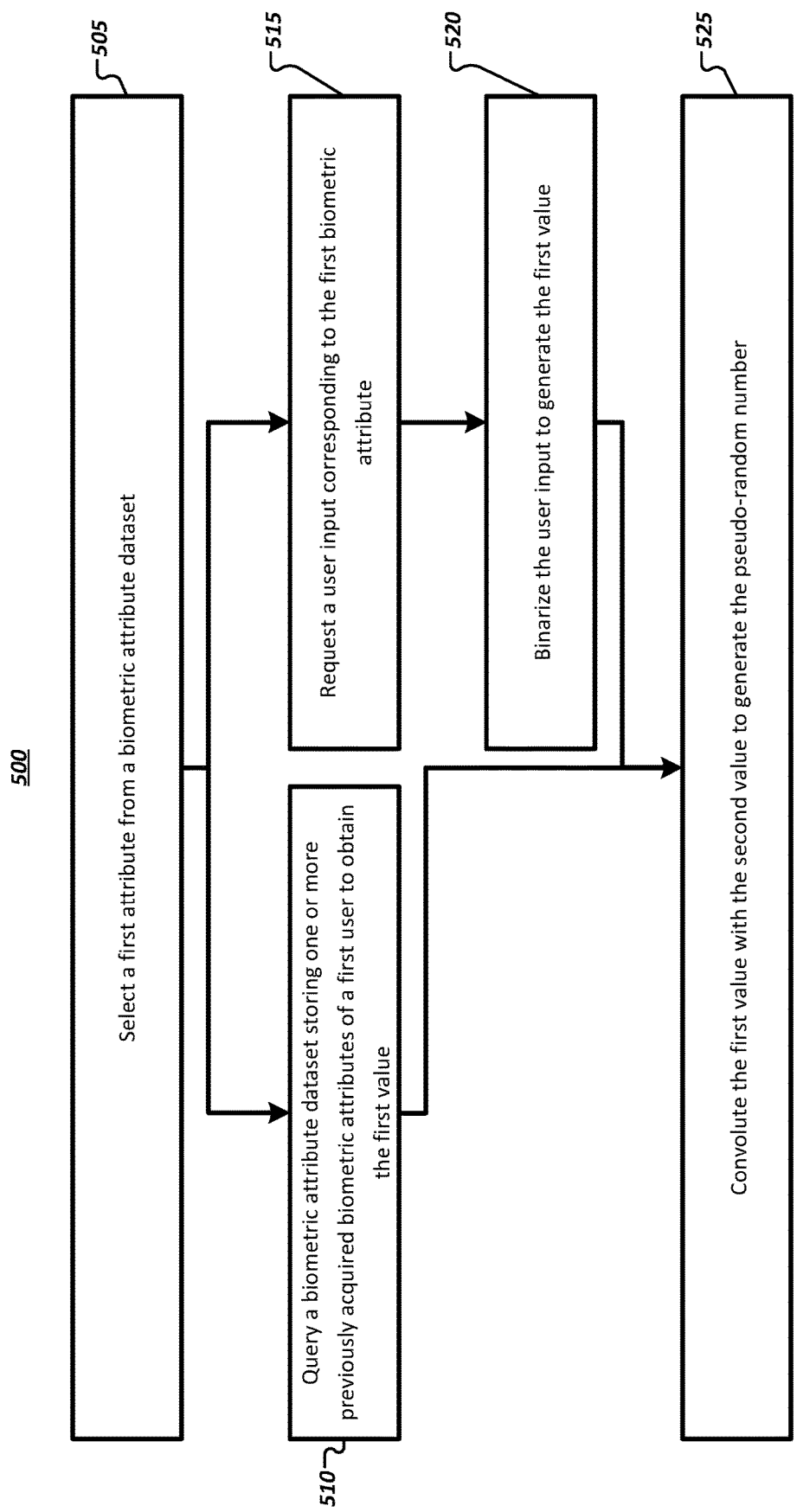
FIG. 5 illustrates an example flowchart for obtaining a first value corresponding to a first attribute from a biometric attribute dataset, in accordance with some example embodiments described herein.

Turning next to FIG. 5, a flowchart is shown that describes example embodiments for obtaining a first value corresponding to a first attribute from a biometric attribute dataset. The operations illustrated in FIG. 5 may, for example, be performed by, with the assistance of, and/or under the control of an apparatus (e.g., number generation server 200), as described above. In this regard, performance of the operations may invoke one or more of processor 202, memory 204, input/output circuitry 206, communications circuitry 208, randomization circuitry 210, convolution circuitry 212, authentication circuitry 214, and/or binarization circuitry 216.

As shown in operation 505, the apparatus 100 may further include means, such as the randomization circuitry 210 or the like for selecting a first attribute from a biometric attribute dataset. As described in reference above in reference to operation 310 in FIG. 3, the randomization circuitry 210 may be configured to pseudo-randomly identify a plurality of attributes from the biometric attribute dataset 112 and select a first attribute to be obtained. By way of example, the randomization circuitry 210 may identify various possible biometric attributes including but not limited to a user's fingerprints, iris scans, retina scans, vein pattern, hair expression, bodily expression, or the like from a biometric attribute dataset. The randomization circuitry 210 may, for example, pseudo-randomly select a user's fingerprints as the first attribute to be obtained.

Thereafter, as shown in operations 510 and 515, the apparatus (e.g., number generation server 200) includes means, such as communications circuitry 208, input/output circuitry 206, or the like, for obtaining a first value for the first attribute by querying a biometric attribute dataset storing one or more previously acquired biometric attributes of a first user or requesting a user input corresponding to the first biometric attribute, respectively. With regard to operation 510, the communications circuitry 208 may query a biometric attribute dataset storing various biometric attributes of a first user. By way of example, in some embodiments, the number generation server 200 may request a user input of various biometric attributes for storing (e.g., in the biometric attribute dataset 112) as a user profile for the associated user. Said differently, the number generation server 200 (e.g., via input/output circuitry of the user device 106) may request input of a user's fingerprints, iris scans, retina scans, vein pattern, hair expression, bodily expression, or the like prior to generating a pseudo-random number. The number generation server 200 may convert this biometric attribute data to corresponding binarized data (e.g., described with reference to operation 520 below).

With regard to operation 515, the input/output circuitry 206 may request a user input corresponding to the first biometric attribute. In some embodiments, the input/output circuitry 206 (e.g., a user display of the user device 106) may request that a user input the first attribute selected above at operation 505 (e.g., via a user display, camera, touchscreen, microphone, etc.). By way of example, the user device 106 may display to a user a request for the user's fingerprint. The user may input their fingerprint via the display of the user device 106 (e.g., a touchscreen display) or by any other related elements or features in communication with the user device 106 (e.g., a detached fingerprint scanner). Alternatively, communications circuitry 208 may be utilized to request this user input from a separate device comprising a biometric scanner of one kind or another.

Thereafter, as shown in operation 520, the apparatus (e.g., number generation server 200) includes means, such as binarization circuitry 216, or the like, for binarizing the user input to generate the first value. By way of continued example with reference to the user's fingerprint as the first biometric attribute, the binarization circuitry 216 may operate to convert the user input corresponding to the first biometric attribute into a numerical representation of the first biometric attribute. The binarization circuitry 216 may receive an image of the user's inputted fingerprint comprised of pixels. Each pixel may have an associated brightness level such that the pixels may be grouped by brightness level or may be assigned a numerical value corresponding to its associated brightness level. The binarization circuitry may generate the first value based upon the binarized user input (e.g., fingerprint) by selecting all or a portion of the numerical values associated with the image pixels. In some embodiments, the brightness level values and the portion of the image pixels selected to generate the first value may themselves be pseudo-randomly selected using various pseudo-randomization methods described herein. Thereafter, as shown in operation 525, the apparatus (e.g., number generation server 200) includes means, such as processor 202, memory 204, communications circuitry 208, convolution circuitry 212, or the like, for convoluting the first value with the second value to generate the pseudo-random number as described in detail above with reference to FIG. 3.

Figure 6:
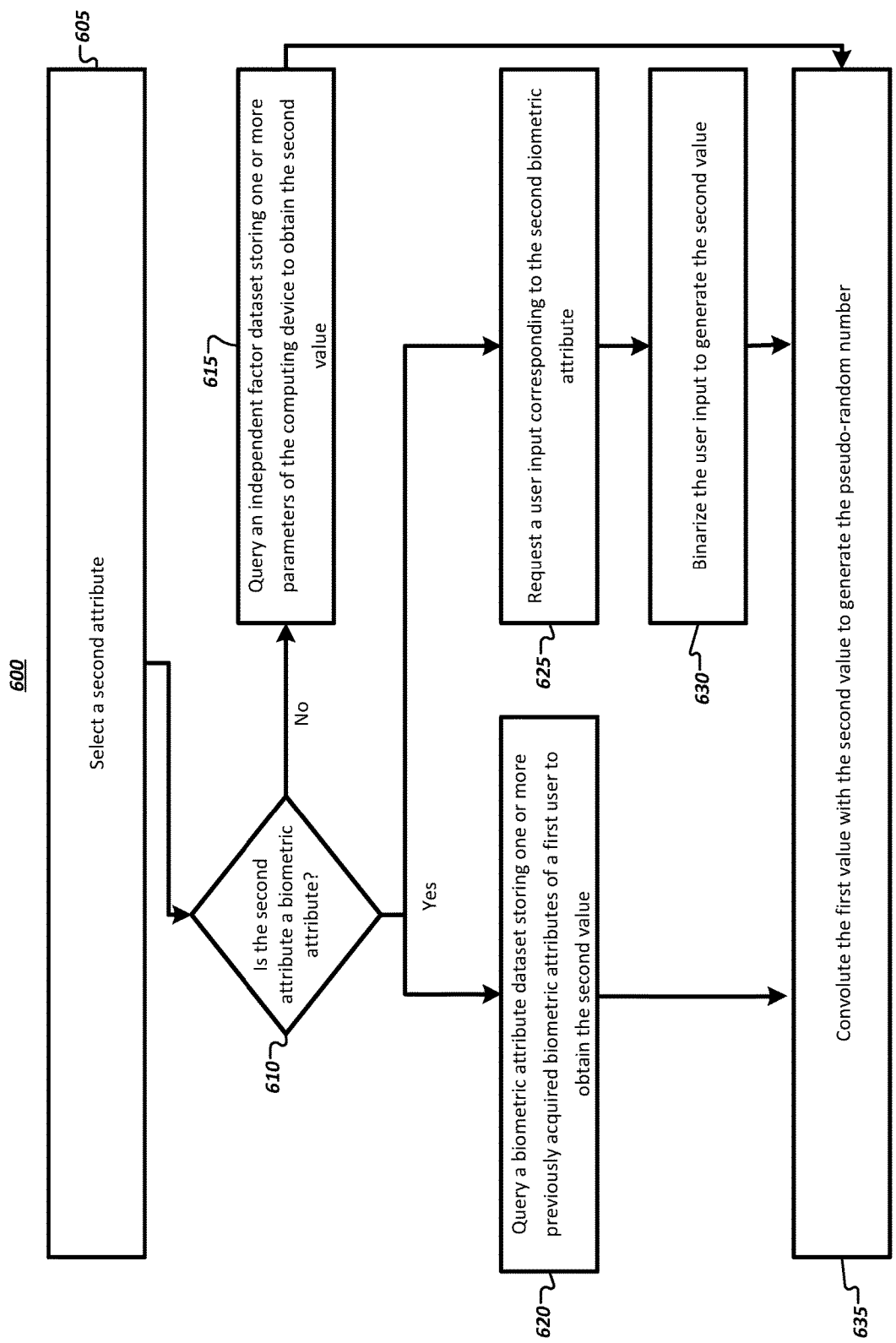
FIG. 6 illustrates an example flowchart for obtaining a second value corresponding to a second attribute in accordance with some example embodiments described herein.

Turning next to FIG. 6, a flowchart is shown that describes example embodiments for obtaining a second value corresponding to a second attribute. The operations illustrated in FIG. 6 may, for example, be performed by, with the assistance of, and/or under the control of an apparatus (e.g., number generation server 200), as described above. In this regard, performance of the operations may invoke one or more of processor 202, memory 204, input/output circuitry 206, communications circuitry 208, randomization circuitry 210, convolution circuitry 212, authentication circuitry 214, and/or binarization circuitry 216.

In operation 605, the apparatus 100 may further include means, such as randomization circuitry 210 or the like for selecting a second attribute. As described in reference above in reference to operation 320 in FIG. 3, the randomization circuitry 210 may be configured to pseudo-randomly identify a plurality of attributes from the biometric attribute dataset 112 or independent factor dataset 114 and select a second attribute to be obtained. By way of example, the randomization circuitry 210 may identify various possible biometric attributes including but not limited to a user's fingerprints, iris scans, retina scans, vein pattern, hair expression, bodily expression, or the like from a biometric attribute dataset and various independent factors such as session time, server temperature, or processor clock speed. The randomization circuitry 210 may, for example, pseudo-randomly select a current time as the second attribute to be obtained.

Thereafter, as shown in operation 610, the apparatus (e.g., number generation server 200) includes means, such as processor 202, input/output circuitry 206, or the like, for determining if the second attribute is a biometric attribute or an independent factor. As described above, in some embodiments, the second attribute may also be a biometric attribute of the use. In such an embodiment, as shown in operations 620, 625, and 630, if the second attribute is a biometric attribute, the number generation server 200 may obtain the second value similar to the first value as described in operations 510, 515, and 520 of FIG. 5. Said differently, if the second attribute is a selected biometric feature, the number generation server 200 may query a biometric attribute dataset storing various biometric attributes of a first user to obtain the second value or may request a user input corresponding to the second biometric attribute and binarize the user input to generate the second value. In some embodiments, requesting user input corresponding to the second biometric attribute at operation 625 may comprises requesting user input comprising a modified form of the first biometric attribute. By way of continued example, the selected first attribute at operation 505 may correspond to a user's fingerprint as described above, while the selected second attribute at operation 605 may correspond to a modified input of the same user's finger, or a fingerprint that is received via a different type of user interface. For example, the input/output circuitry of the user device 106 may request a user input corresponding to an inverted or otherwise tilted input of the user's fingerprint. In this way, the user input of the second biometric feature is a modification of the first biometric feature and results in a different image (e.g., and, therefore, a different binarized user input for the second value). The present disclosure contemplates that any number of modifications of the first user input (e.g., requesting a different finger of the user, requesting a different placement angle of the user's finger, or the like) may be utilized as the user input corresponding to the second biometric attribute.

As described above, in some embodiments, the second attribute may be an independent factor. In such an embodiment, with reference to operation 615, the apparatus (e.g., number generation server 200) includes means, such as communications circuitry 208, randomization circuitry 210, or the like, for querying an independent factor dataset storing one or more parameters of the computing device to obtain the second value. For example, the randomization circuitry 210 may query the independent factor dataset 114 to retrieve an independent factor of various independent factors (e.g., session time, server temperature, processor clock speed, etc.). Said differently, the randomization circuitry 210 may obtain a current time from the independent factor dataset populated from an internal system clock of the number generation server 200 as the second attribute to be obtained. Thereafter, as shown in operation 635, the apparatus (e.g., number generation server 200) includes means, such as processor 202, memory 204, communications circuitry 208, convolution circuitry 212, or the like, for convoluting the first value with the second value to generate the pseudo-random number as described in detail above with reference to FIG. 3.

As described above, various technical challenges are surmounted via technical solutions contemplated herein. For instance, the convolution of a pseudo-randomly-selected biometric attribute and an independent factor provides increased session security by requiring a perpetrator to (1) access each of a user's biometric attributes, (2) select the correct biometric attribute, (3) access the user's session time or other independent factor, and then (4) learn the appropriate transformation applied using the steps describe above. And by performing various operations contemplated herein, embodiments of the present disclosure provide improved session authentication techniques by convoluting at least one random biometric attribute with an independent factor (e.g., session time) in order to generate a unique seed for a pseudo-random number used to establish a secure session. By selecting one of various possible biometric attributes (e.g., fingerprints, iris scans, retina scans, vein pattern, hair expression, bodily expression, or the like) of a user and convoluting the binarized biometric attribute data with an independent factor such as session time or another selected biometric attribute, pseudo-random numbers of near-infinite scope and degree can be generated that are hardened against newer and more powerful malicious attacks that exploit the growing ubiquity of powerful computing resources. In this way, the possibility of determining the pseudo-random numbers by a perpetrator are greatly reduced or made substantially impossible even in the face of an increasingly sophisticated globally networked environment.

FIGS. 3-6 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the number generation server 200 and executed by a processor 202 of the number generation server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for improved pseudo-random number generation, the method comprising:
   receiving, by a computing device, a request for a pseudo-random number;
   selecting, by randomization circuitry of the computing device, a first attribute;
   obtaining a first value for the first attribute;
   selecting, by the randomization circuitry, a second attribute;
   obtaining a second value for the second attribute; and
   generating, by convolution circuitry of the computing device, the pseudo-random number based upon the first value and the second value.

2. The method according to claim 1, further comprising:
   receiving, by communications circuitry of the computing device, an instruction to generate a session identifier from a first user device associated with a first user;

determining, by authentication circuitry of the computing device, that the request for the session identifier requires the pseudo-random number;
generating, by the authentication circuitry, the session identifier based upon the pseudo-random number; and
transmitting, by the communications circuitry, the session identifier to the first user device.

3. The method according to claim 2, further comprising:
generating, by the computing device, a data seed based on the pseudo-random number, wherein the session identifier comprises the generated data seed.

4. The method according to claim 2, wherein the session identifier comprises the pseudo-random number.

5. The method according to claim 2, further comprising, transmitting, by the authentication circuitry, the session identifier to an external device.

6. The method according to claim 1, wherein obtaining the first value comprises querying, by communications circuitry of the computing device, a biometric attribute dataset storing one or more previously acquired biometric attributes of a first user.

7. The method according to claim 1, wherein obtaining the first value comprises:
requesting, by the computing device, user input corresponding to a first biometric attribute; and
binarizing, by binarization circuitry of the computing device, the user input to generate the first value.

8. The method according to claim 1, wherein obtaining the second value comprises:
requesting, by the computing device, user input corresponding to a second biometric attribute; and
binarizing, by the binarization circuitry, the user input corresponding to the second biometric attribute to generate the second value.

9. The method according to claim 8, wherein obtaining the second value further comprises requesting, by the computing device, user input comprising a modified form of a first biometric attribute.

10. The method according to claim 1, wherein obtaining the second value comprises querying, by the computing device, an independent factor dataset storing one or more parameters of the computing device to identify a particular independent factor, wherein the second value comprises the identified particular independent factor.

11. The method according to claim 10, wherein the identified particular independent factor comprises a current time, and wherein obtaining the second value comprises generating a current time from an internal system clock of the computing device or identifying a time at which the request for the pseudo-random number was received by the computing device.

12. The method according to claim 1, wherein selection of the first attribute comprises implementing, by the randomization circuitry, a pseudo-random selection protocol that identifies a first particular attribute from a biometric attribute data set.

13. The method according to claim 1, wherein selection of the second attribute comprises implementing, by the randomization circuitry, a pseudo-random selection protocol that identifies a second particular attribute from a biometric attribute data set.

14. An apparatus for generating an improved pseudo-random number, the apparatus comprising:
randomization circuitry configured to:
select a first attribute; and
select a second attribute;
input/output circuitry configured to:
obtain a first value for the first attribute; and
obtain a second value for the second attribute; and
convolution circuitry configured to generate a pseudo-random number based upon the first value and the second value.

15. The apparatus according to claim 14, further comprising:
communications circuitry configured to receive an instruction to generate a session identifier from a first user device associated with a first user; and
authentication circuitry configured to:
determine that the request for the session identifier requires the pseudo-random number; and
generate the session identifier based upon the pseudo-random number,
wherein the communications circuitry is further configured to transmit the session identifier to the first user device.

16. The apparatus according to claim 15, wherein the authentication circuitry is further configured to generate a data seed based on the pseudo-random number, wherein the session identifier comprises the generated data seed.

17. The apparatus according to claim 15, wherein the session identifier comprises the pseudo-random number.

18. The apparatus according to claim 14, further comprising:
input/output circuitry configured to request a user input corresponding to the first attribute; and
binarization circuitry configured to binarize the user input to generate the first value.

19. The apparatus according to claim 14, further comprising communications circuitry configured to query an independent factor dataset storing one or more parameters of the computing device to obtain the second value.

20. A non-transitory computer-readable storage medium for using an apparatus to generate an improved pseudo-random number, the non-transitory computer-readable storage medium storing instructions that, when executed, cause the apparatus to:
receive a request for a pseudo-random number;
select a first attribute;
obtain a first value for the first attribute;
select a second attribute;
obtain a second value for the second attribute; and
generate the pseudo-random number based upon the first value and the second value.

* * * * *